US006298597B1

(12) United States Patent
Koehler et al.

(10) Patent No.: US 6,298,597 B1
(45) Date of Patent: Oct. 9, 2001

(54) NON-EDIBLE FORAGING MATRIX INSERT FOR SUBTERRANEAN TERMITE CONTROL

(75) Inventors: Philip G. Koehler; Faith M. Oi, both of Gainesville, FL (US)

(73) Assignees: University of Florida, Gainesville, FL (US); The United States of America as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 09/525,086

(22) Filed: Mar. 14, 2000

Related U.S. Application Data

(60) Provisional application No. 60/159,266, filed on Oct. 13, 1999.

(51) Int. Cl.[7] .................................................. A01M 1/20
(52) U.S. Cl. ............................ 43/131; 43/124; 43/132.1; 43/107
(58) Field of Search ........................ 43/131, 124, 132.1; 424/84

(56) References Cited

U.S. PATENT DOCUMENTS

| 3,940,875 | 3/1976 | Basile ................................ 43/124 |
| 3,972,993 | 8/1976 | Kobayashi ........................ 424/15 |
| 4,043,073 | 8/1977 | Basile ................................ 43/124 |
| 4,625,474 | 12/1986 | Peacock ............................ 52/101 |
| 5,329,726 | 7/1994 | Thorne .............................. 43/124 |
| 5,501,033 | 3/1996 | Wefler .............................. 43/131 |
| 5,555,672 | * 9/1996 | Thorne et al. .................... 43/124 |
| 5,609,879 | 3/1997 | Myles .............................. 424/410 |
| 5,778,596 | 7/1998 | Henderson et al. ............. 43/132.1 |
| 5,832,658 | * 11/1998 | Random ............................ 43/131 |
| 5,899,018 | 5/1999 | Gordon ............................ 43/131 |
| 5,921,018 | 7/1999 | Hirose .............................. 43/132.1 |
| 5,935,943 | * 8/1999 | Asai et al. ...................... 514/63 |
| 5,950,356 | 9/1999 | Nimocks .......................... 43/131 |
| 6,003,266 | * 12/1999 | Woodruff .......................... 43/124 |

FOREIGN PATENT DOCUMENTS

| 2306886-A | * 5/1997 | (GB) . |
| 2306886 | 5/1997 | (GB) . |
| WO/93/23998 | 12/1993 | (WO) ........................ A01N/25/00 |
| WO-98/25462 | * 6/1998 | (WO) . |

OTHER PUBLICATIONS

*Laboratory Evaluation I of Insecticides for Control of Tarnished Plant Bug in Mississippi*, research report from University of Mississippi website, 1995.
*Letter to Kandy Walker Duke at Rhone Merieux from New York State Department of Environmental Conservation*, letter dated Feb. 7, 1997, obtained from website address: pmep.cce.cornell.edu, updated Dec. 16, 1997.

(List continued on next page.)

Primary Examiner—Peter M. Poon
Assistant Examiner—Andrea M. Valenti
(74) Attorney, Agent, or Firm—M. Howard Silverstein; John D. Fado; Gail E. Poulos

(57) ABSTRACT

A termite control system kit. A several step process starts with taking a tube with a removal cap at one end, such as a two to four inch PVC tube, and filling the inner chamber with a food source such as rolled cardboard. The tube is then placed with its open end adjacent to a termite population so that live termites can then enter the entrance/exit of the tube to reach the food source. Once termites are inside the tube, the cap is removed from the tube, and a non-edible foraging matrix, such as a disc of loose soil and or sand that is treated with a slow acting and non-repellant toxicant, is placed between the food source in the chamber and the termite entrance/exit of the chamber. Slow acting and non-repellent toxicants can be non-immediate lethal doses of fipronil, chlorfenapyr, imidacloprid, and chlorpyrifos. The termites are then forced to pass through and disperse the slow-acting and non-repellent toxicant on soil particles or other non-edible foraging matrices through their tunnels and living space in order to kill termites. Termites that contact tunnels and living space contaminated with the treated non-edible foraging matrix particles die over time.

28 Claims, 5 Drawing Sheets

OTHER PUBLICATIONS

*Rhône–Poulenc's Fipronil give approval for Clorox Products*, press release from library section of website www.rhone–poulenc.com, Aug. 5, 1997, last updated Feb. 11, 1998.

*Toxicity and Degradation of Fipronil Applied to Cotton for Control of Boll Weevils*, Joseph E. Mulrooney and Deepa Goli, interpretive summary for TEKTRAN website address www.nal.usda.gov, Dec. 3, 1997.

*Fipronil*, NPTN fact sheet on Fipronil from National Pesticide Telecommunications Network website, 5 pages, Dec. 1997.

*Prospective Study Comparing Fipronil with dichlorvos/fenitrothion and methoprene/pyrethrins in control of Flea Bite Hypersensitivity in Cats*, R.G. Harvey, E.J. Penaliggon, and P. Gautier, Veterinary Record (1997), www.inno–vet.com.

Website www.peteducation.com, general information on Fipronil as used in flea prevention and treatment 1997, 3 pages.

*Control of Corn Root Worm in Green Peas*, WSU cooperative extension research report, Washington State University, www.agsyst.wsu.edu, last updated Jul. 24, 2000.

*Residue Analysis of Fipronil and its Metabolites Observec in Leek Samples*, Guido Goller, Patrick Duchene and Marc Maestracci, report available on website www.chemsoc.org, no date listed, one page.

*Ciquets ou pesticides? Madagascar pris entre deux feux*, french report on Fipronil from website www.francophonie.org, no date listed, two pages.

*Evaluation of Fipronil for residual control of mole crickets on turfgrass*, Table of results using Fipronil to treat mole crickets on turfgrass, no date listed, one page.

*Field Trials to Evaluate the Efficacy of Fipronil (regent R) for Controlling Rice Insects Under Different Formulations*, Luuong Minh Chau, report posted on website www.chemsoc.org, no date listed, two pages.

Maxforce Bait Gel–FC–German Roaches, www.roachcontrol.com, website advertisement for Maxforce Gel FC, no date listed, three pages.

French, Baits and Foraging Behavior of Australian Species of Coptotermes, *Sociobiology*, vol. 19, No. 1, 1991.

Rust, Enhancing Foraging of Western Subterranean Termites (Isoptera:Rhinotermitidae) in Arid.

French, Combining Physical Barriers, Bait and Dust Toxicants in Future Strategies for Subterranean Termite Control (Isoptera), *Sociobiology* vol. 24, No. 1, 1994.

* cited by examiner

NON-EDIBLE FORAGING MATRIX INSERT FOR SUBTERRANEAN TERMITE CONTROL

This invention claims priority of U.S. Provisional Patent Application No. 60/159,266 filed on Oct. 13, 1999.

This invention relates to termite control, and in particular to an apparatus and method for using a non-toxic food source to attract termites into a chamber, and afterwards inserting a non-edible foraging matrix treated with a slow acting and non-repellant toxicant, into the termite entrance and exit of the chamber causing the termites to take the toxicant back to the galleries and living areas of their colony.

BACKGROUND AND PRIOR ART

The two forms of subterranean termites that are of concern for pest control are subterranean termites, which typically nest in the ground and usually maintain some sort of ground connection, and drywood termites, which start as a pair in a piece of wood and do not have a ground connection. Subterranean termites are the most damaging termites and usually enter buildings from the surrounding soil. There have been several methods of subterranean termite control. For example, the most common method of subterranean termite control requires soil underlying a structure to be treated with a termiticide barrier (usually hundreds of gallons of termiticide per house) to prevent termites from entering the structure from the ground. From 1950 to 1988 the chlorinated hydrocarbons were the main method of barrier treatment to control subterranean termites; however, environmental concerns with those chemical treatments resulted in the loss of chlorinated hydrocarbons that lasted up to 35 years in the soil. Chemicals that replaced the chlorinated hydrocarbons for barrier treatment have had a high rate of failure resulting in extensive termite damage to structures. The problems with the barrier treatments are compounded since builders have often been known to dump substantial amounts of edible building materials, such as wood and cardboard into the underlying soil that can serve as Guidelines into the structures and provide a substantial food source, increasing the probability of termite infestation in the structure. Several systems have been proposed to enhance the underground delivery of toxic insecticides beneath structures. See for example, U.S. Pat. Nos. 3,940,875 and 4,043,073 to Basile; and U.S. Pat. No. 4,625,474 to Peacock. However, these systems are only concerned with trying to refresh the initial termiticide barrier by having the termites chew through a container with the toxicant (Basile) or by installing a piping system during construction so that additional termiticide can be pumped under a slab at intervals after construction. Furthermore, the Basile patent utilized a toxicant (dieldrin) that has been banned by the EPA for termite treatment, and the pipe system often got clogged after installation making it not usable.

Other well-known subterranean termite treatments include bait techniques, which require termites to forage into a monitor that contains a non-toxic food source. Once termites infest the non-toxic food source, a food source laced with a toxicant (toxic bait) is replaced into the monitor. Termites continue to recruit to the monitor and feed on the toxic bait. Consumption and trophallaxis (feeding other termites) of the toxic bait causes many termites to die. See for example, U.S. Pat. No. 5,329,726 to Thorne et al.; U.S. Pat. No. 5,899,018 to Gordon et al.; and U.S. Pat. No. 5,950,356 to Nimocks. However, these techniques generally require that the termites consume the toxic bait. Termites refuse to consume most toxicants; therefore this technique is useful for only 2–3 toxicants currently known in the world. Termites also refuse to consume bait food sources that are contaminated with molds or are too wet. These bait techniques do not use a non-edible foraging matrix (described in our invention), such as soil, to cause the termites to tunnel therethrough and carry the particles treated with toxicant to the galleries and living spaces of the colony; thus contaminating them. Most toxicants applied to non-edible foraging matrix, except the repellent pyrethroids, will be picked up and carried by termites to other areas of their tunnel system.

Other systems have been proposed but still fail to overcome the problems with the methods and applications described for the cited patents above. See for example, U.S. Pat. No. 3,972,993 to Kobayashi et al. requires a membrane treated with a substance attractive to termites (due to the termite's innate searching and feeding behavior, termites are not attracted to food from a distance when allowed to forage without interference) so that when the termites chew through the membrane a toxic surface is contacted; U.S. Pat. No. 5,501,033 to Wefler delivers a liquid toxic food source for social insects like yellow jackets and has very little use for termites; U.S. Pat. No. 5,609,879 to Myles requires the laborious harvesting of termites from the ground, sponging on an insecticidal epoxy, and returning them to the soil; U.S. Pat. No. 5,778,596 to Henderson et al. is a device for delivering toxic food for termites to consume; U.S. Pat. No. 5,921,018 to Hirose provides foraging guidelines for termites to follow so they enter a device that captures and kills them.

There are additional problems with prior art treatments that use repellent liquids, non-repellent liquids, and baits. When using repellent liquids, the liquid barriers need to be applied in a perfectly continuous fashion. If gaps in the treatment exist, especially with repellent termiticides, such as those belonging to the pyrethroid class, the termites will forage and find the gaps in the treatment, increasing the probability of infesting the structure.

In non-repellent liquid treatments, the termites are not able to detect that they are in a treated area; hence the classification "non-repellent," and they die. A major drawback is that liquid termiticides in this class are new and there are questions about how long they will last in the soil, especially when exposed to sun and weather. The present invention protects the foraging matrix from sun and weather to prolong its usability, and the foraging matrix can be replaced as necessary to recharge the system. The application of liquid termiticide barriers requires several hundred gallons of insecticide that are pumped under houses, sometimes resulting in contamination of the house interior and water supply wells. Most homeowners want applications that are less intrusive and disruptive.

Baits require a food source that is palatable to termites. Selecting the appropriate food source can be difficult. Wood is very inconsistent in composition, so manufacturers don't like to use it for use with toxicants. Paper food sources, if not packed tightly enough, will be emptied by termites and not deliver enough toxicant to kill large numbers of termites. Most cellulose material will rot when placed in the soil. Once the food goes bad, termites will not feed, rendering the bait ineffective. The subject invention uses a non-edible foraging matrix treated with a slow-acting non-repellent toxicant. Termites put the particles of the treated matrix into their mouths when they tunnel through it, and many toxicants will work because they do not need to consume it and feed it to others. The particles are returned to the colony and incorporated into their tunnels. Termites that contact the particles die several days after the toxicant on the matrix particles are contacted. The behavior of the termites moves the treated foraging matrix from the exit and entrance opening of the device's chamber to contaminate their colony and tunnels.

SUMMARY OF THE INVENTION

The first objective of the present invention is to provide a method and system for killing termites over time and protecting structures.

The second objective of this invention is to provide a method and system for destroying termites using a non-toxic and edible food source to attract the termites and only causing the termites to tunnel through non-edible particles treated with a slow-acting and non-repellant toxicant when the termites return to their colonies so that the termites contaminate their galleries and living spaces with the particles.

The third objective of this invention is to use soil particles, sand particles, mixtures or other non-edible foraging matrices as a method of dispersing the toxicant to other termites that pass through termite tunnels, galleries, and living spaces.

A preferred embodiment of the method and apparatus of killing termites and protecting structures includes the steps of: inserting a nontoxic food source such as wood, paper, cardboard, and cellulose-based material, into a chamber having a termite entrance and exit opening and a closed end, positioning the termite entrance and exit opening to the chamber adjacent to termites and allowing the termites to enter and eat the nontoxic food source, inserting a foraging non-edible matrix treated with a slow acting and non-repellent toxicant into the termite entrance and exit opening to the chamber so that the foraging matrix is between the non-toxic food source and the termite entrance and exit opening, and allowing the termites to exit from the termite entrance and exit opening to the chamber, wherein the slow acting and non-repellent toxicant destroys the termites in their colonies over time and protects structures.

The chamber can be a tube-shaped material suitable for containing a non-toxic food source and a disc-shaped bait containing a toxicant for placing in a location containing termites, such as for example a capped PVC tube, or the like. The user can initially insert the termite entrance and exit opening to the chamber adjacent to locations containing subterranean termites. The cap should be removable so the chamber can be serviced through time.

The non-edible foraging matrix can be chosen from soil, sand, combinations thereof, and the like. The non-edible foraging matrix can be shaped into a disc shape that can include a bag formed from paper, cellulose material, or other material that will allow termites access to the non-edible foraging matrix.

Toxicants suitable for use are slow acting, non-repellant toxicants for control of subterranean termites. These include for example chlorinated nicotine derivatives such as fipronil and imidachoprid; organophosphates such as chlorpyrifos; pyrroles such as chlorfenapyr. A preferred embodiment of the slow acting and non-repellent toxicant can include approximately 1.25 ppm to approximately 12.5 ppm of fipronil. The slow acting and non-repellent toxicant can also include approximately 2.5 ppm to approximately 25 ppm of chlorfenapyr. The slow acting and non-repellent toxicant can also include approximately 0.5 ppm to approximately 50 ppm of imidacloprid. The slow acting and non-repellent toxicant can also include approximately 0.5 to approximately 50 ppm of chlorpyrifos or other toxicants that is not repellent to the termites.

Further objects and advantages of this invention will be apparent from the following detailed description of a presently preferred embodiment, which is illustrated schematically in the accompanying drawings.

DESCRIPTION OF THE PREFERRED EMBODIMENT

Figure 1:
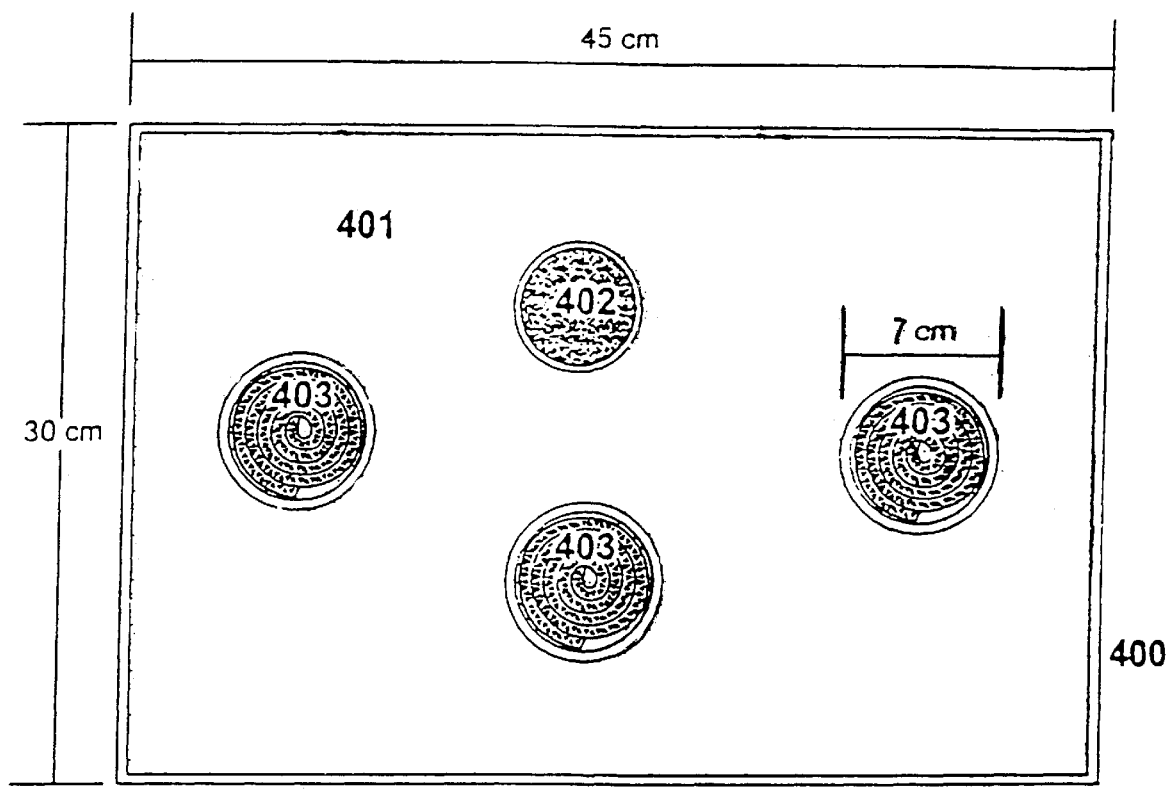
FIG. 1 shows an experimental setup for testing the novel treatment apparatus and method.

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

The subject invention was tested recently at the USDA-ARS Center for Medical, Agricultural, and Veterinary Entomology, at Gainesville, Fla.

Data from two sets of experiments are included. In the first set of experiments, a total of 3,000 termites were used (2,970 workers and 30 soldiers) in all three replicates. In the second set of experiments, 3,000 termites were used in 4 replicates and 1,400 termites (1,386 workers and 14 soldiers) were used in two replicates for a total of six replicates. Fewer termites from 2 colonies were used because we could not collect enough to complete the replicates if a total of 3000 termites were used. The termites (*Reticulitermes flavipes* (Kollar)) were field collected from field colonies, separated from debris, and held in the laboratory at the USDA (United States Department of Agriculture) for no more than 14 days before introduction into a test arena for each experimental block. Termites from a different colony were used for each replicate.

The test arena consisted of Plexiglas sides (45 cm long, by 30 cm wide by 5.5 cm high) taped to a glass bottom (45 cm long, by 30 cm wide, by 0.6 cm high) with clear packing tape, manufactured by Crystal Clear, Manco Inc., Avon, Ohio. The Plexiglas sides were assembled by joining pieces with methylene chloride. Before the Plexiglas sides were taped to the glass bottom, the sides were baked in an oven at 40+/−2° C. for 24 hours to ensure that any volatiles caused by the methylene chloride were removed.

Builders sand from Unified Classification SP, O'Steen Bros., Inc., of Gainesville, Fla., was oven dried at 60+/−2° C. for at least 24 hours in metal pans. The sand was cooled and sieved using a sieve manufactured from Fisher Scientific Co., USA sieve no. 25, having openings of approximately 0.0278 inches each. The sieve was used to remove large pieces of debris. Two thousand five hundred grams (+/−1 g) of sand were poured into the arena and mixed thoroughly with 250 ml of double filtered, de-ionized water, which brought the moisture content of the sand to 10%. The sand was tamped and leveled.

Three monitoring stations were placed on top of the moistened builder's sand. The monitors were made of one roll of corrugated cardboard (100 cm by 6.5 cm) that was moistened and stacked into a white PVC coupler having an inner diameter of approximately 7 cm and being approximately 7.3 cm high, manufactured from Lasco of Brownsville, Tenn.

The non-edible foraging matrix treated with toxicant and used for the testing was a loamy, siliceous, thermic, arenic paleudults soil, which was a common sandy loam native soil from Central Florida. This native soil was initially oven dried at 150+/−2° C. for at least 24 hours, then cooled, then sifted to remove large pieces of organic debris. After treatment with a toxicant, the treated non-edible foraging matrix was formed into a disc for insertion into the monitors after termite activity occurred. The color contrast between the builder's sand, which was light honey color, and the native non-edible foraging matrix, which was a dark brown, was enough to see termites move portions of the treated soil particles from the discs into the tunnels.

In both sets of experiments, three different non-edible foraging matrix treatment applications were prepared using novel selected amounts of termite treatment chemicals. The difference between the first experiment and the second experiment was the rates used. In the first experiment, the first application had a non-edible foraging matrix sample treated with 50 ppm of imidacloprid, a version entitled Premise from the Bayer Corp. of Kansas City, Kans. The second application had the non-edible foraging matrix sample treated with 250 ppm of chlorfenapyr, a version entitled Phantom from American Cyanamid of Princeton, N.J. A third application had the non-edible foraging matrix treated with 125 ppm of fipronil, a version entitled Termidor, from Rhone-Poulenc of Research Triangle, N.C.

In the second experiment, the first application had a non-edible foraging matrix sample treated with 0.5 and 5.0 ppm of imidacloprid, a version entitled Premise from the Bayer Corp. of Kansas City, Kans. The second application had the non-edible foraging matrix sample treated with 2.5 and 25.0 ppm of chlofenapyr, a version entitled Phantom from American Cyanamid of Princeton, N.J. A third application had the non-edible foraging matrix treated with 1.25 and 12.5 ppm of fipronil, a version entitled Termidor, from Rhone-Poulenc of Research Triangle, N.C. It is important to note that the rates used were approximately 10 and 100 times less than the rates use in the first experiment and are also 10 to 100 times less than the rates listed or proposed on the pesticide labels. Thus, the rates used in this experiment was not used for the intended purpose of the chemicals, which was to immediately kill the termites by creating a chemical barrier completely around the structure.

In both experimental set ups, controls were treated with filtered and deionized water. The treated non-edible foraging matrix was air dried for 7 days and stored in sealed plastic bags until ready for use.

Discs of treated non-edible foraging matrix were prepared by thoroughly moistening 100 grams (+/−5 g) of treated non-edible foraging matrix with about 10 ml of filtered, de-ionized water. Monitors were lined with a double layer of paper towels (28 cm by 22.5 cm) manufactured by Somerset paper towels of Bernardsville, N.J. The non-edible foraging matrix was packed into the paper towel lined PVC coupler, which produced the non-edible foraging matrix disc having dimensions of approximately 7 cm diameter by approximately 2 cm high. The excess paper towel was twisted and sealed with a rubber band so that the treated non-edible foraging matrix would not contaminate the surrounding area until the termites had tunneled through it.

After allowing the termites to forage for 7 days in the arenas, the termites were sampled from each of the infested monitors by removing the cardboard roll, separating out the termites, and counting the live ones. The treated non-edible foraging matrix disc was introduced into the base of the monitor that contained the most termites. The treated non-edible foraging matrix disc was placed in the bottom of the monitor and a new, moistened cardboard roll (100 cm by 4 cm) was placed on top. The PVC coupling unit was placed so that the non-edible foraging matrix disc was in contact with the builder's sand. Termites were returned to their respective monitors that were provisioned with new cardboard rolls by gently pouring them into the tops of the monitors. The number of termites recovered from each of the three monitors was recorded weekly for eight weeks. The total number of termites recovered from all three monitors was calculated, and the mean and standard error for each treatment and the control was calculated and reported weekly for 8 weeks.

Both experiments were designed as a randomized complete block, blocking on colony for each termiticide. In the first experiment, treatments included a control and 3 termiticides at one concentration, replicated 3 times for a total of 12 experimental units. In the second experiment treatments included a control and 3 termiticides at two concentrations, replicated six times for a total of 48 experimental units. Treatment effects on percent termite survival were analyzed by analysis of variance (ANOVA) and Tukey's HSD (SAS Institute 1996) which, when used in combination, indicate which treatments were significantly different from each other in killing termites under our conditions.

In the first experiment, numbers of termites in untreated arenas were consistently higher than numbers of termites in arenas with a treated disc of foraging matrix inserted at the base of one of the 3 monitors. Both 125 ppm fipronil and 250 ppm chlorfenapyr killed all termites in the arenas by 7 weeks after setup, and 50 ppm imidacloprid had only 54 termites in the monitors (See Table 1). We noticed that the treated non-edible foraging matrix had been moved from the discs into the galleries, contaminating the termite tunnels and living areas. Termites from the sand in the foraging trav were not recovered or counted.

Table 1. Numbers of termites in monitors within experimental arenas treated with foraging matrices containing 50 ppm imidacloprid, 125 ppm fipronil, and 250 ppm chlorfenapyr. Untreated discs were foraging matrices were treated with water.

| | Mean ± SE number of termites in monitors for | | | |
|---|---|---|---|---|
| Week | Fipronil | Chlorfenapyr | Imidacloprid | Untreated |
| 1 | 73.8 ± 11.1 | 100 ± 11.9 | 82.0 ± 2.7 | 80.4 ± 5.0 |
| 2 | 44.3 ± 18.8 | 60.7 ± 12.9 | 67.5 ± 0.1 | 68.0 ± 8.7 |
| 3 | 14.6 ± 8.0 | 21.3 ± 12.2 | 45.7 ± 14.9 | 66.1 ± 8.0 |
| 4 | 6.4 ± 3.4 | 10.9 ± 7.6 | 13.7 ± 2.9 | 47.8 ± 8.2 |
| 5 | 2.6 ± 1.6 | 3.5 ± 3.3 | 8.0 ± 3.7 | 30.9 ± 8.8 |
| 6 | 0.3 ± 0.3 | 0.8 ± 0.8 | 3.2 ± 3.0 | 23.8 ± 9.1 |

-continued

| | Mean ± SE number of termites in monitors for | | | |
|---|---|---|---|---|
| Week | Fipronil | Chlorfenapyr | Imidacloprid | Untreated |
| 7 | 0 ± 0 | 0 ± 0 | 1.4 ± 1.4 | 17.2 ± 7.5 |
| 8 | 0 ± 0 | 0 ± 0 | 1.8 ± 0.9 | 11.6 ± 8.4 |

In the second experiment, termite survival in arenas was counted when termite activity in the monitors was not detected. Time for cessation of termite activity was 5 weeks for fipronil and 8 weeks for chlorfenapyr and imidacloprid (Table 2). For chlorfenapyr, percent survival was 0.16% for the 25 ppm foraging matrix and 9.33% for the 2.5 ppm foraging matrix compared with 20.92% survival in the untreated arenas. Therefore the chlorfenapyr killed virtually all the termites at 25 ppm. For fipronil, percent survival was 0.3–0.5% for 12.5 and 1.25 ppm foraging matrix compared with 39% in the untreated arenas. Therefore, fipronil killed virtually all the termites at 1.25 and 12.5 ppm. For imidacloprid, percent survival was 17% for 0.5 and 5.0 ppm foraging matrix compared with 23% in the untreated arenas; indicating that the experiment could have been run longer for imidacloprid or that a higher dose of toxicant could have been used. In all cases the treated foraging matrix was moved from the discs and incorporated into the termite tunnels and living space killing termites as they contacted the treated non-edible foraging matrix particles.

Table 2. Mean survival of termites in experiment arenas with foraging matrix discs treated with chlorfenapyr or imidacloprid after 8 weeks and with fipronil after 5 weeks. Untreated discs were treated with water.

| Treatment | Mean ± SE percent survival of termites |
|---|---|
| Chlorfenapyr 2.5 ppm | 9.33 ± 5.05a[1] |
| Chlorfenapyr 25.0 ppm | 0.16 ± 0.16b |
| Untreated | 20.92 ± 6.89a |
| Fipronil 1.25 ppm | 0.51 ± 0.30b |
| Fipronil 12.5 ppm | 0.30 ± 0.29b |
| Untreated | 39.28 ± 8.11a |
| Imidacloprid 0.5 ppm | 17.13 ± 11.61a |
| Imidacloprid 5.0 ppm | 17.57 ± 9.36a |
| Untreated | 23.44 ± 10.89a |

[1]Means followed by the same letter are not significantly different.

FIG. 1 shows the experimental set up for testing the novel treatment apparatus and method. The bottom of the arena 400 is covered with builders sand 401. Termites are released into the arena in a release chamber 402. There are 3 monitors 403 (PVC tubes containing cardboard) to monitor numbers of termites. After termites are established one of the monitors is selected to receive a treated foraging matrix disc at the termite entrance and exit of the monitoring tube.

Figure 2:
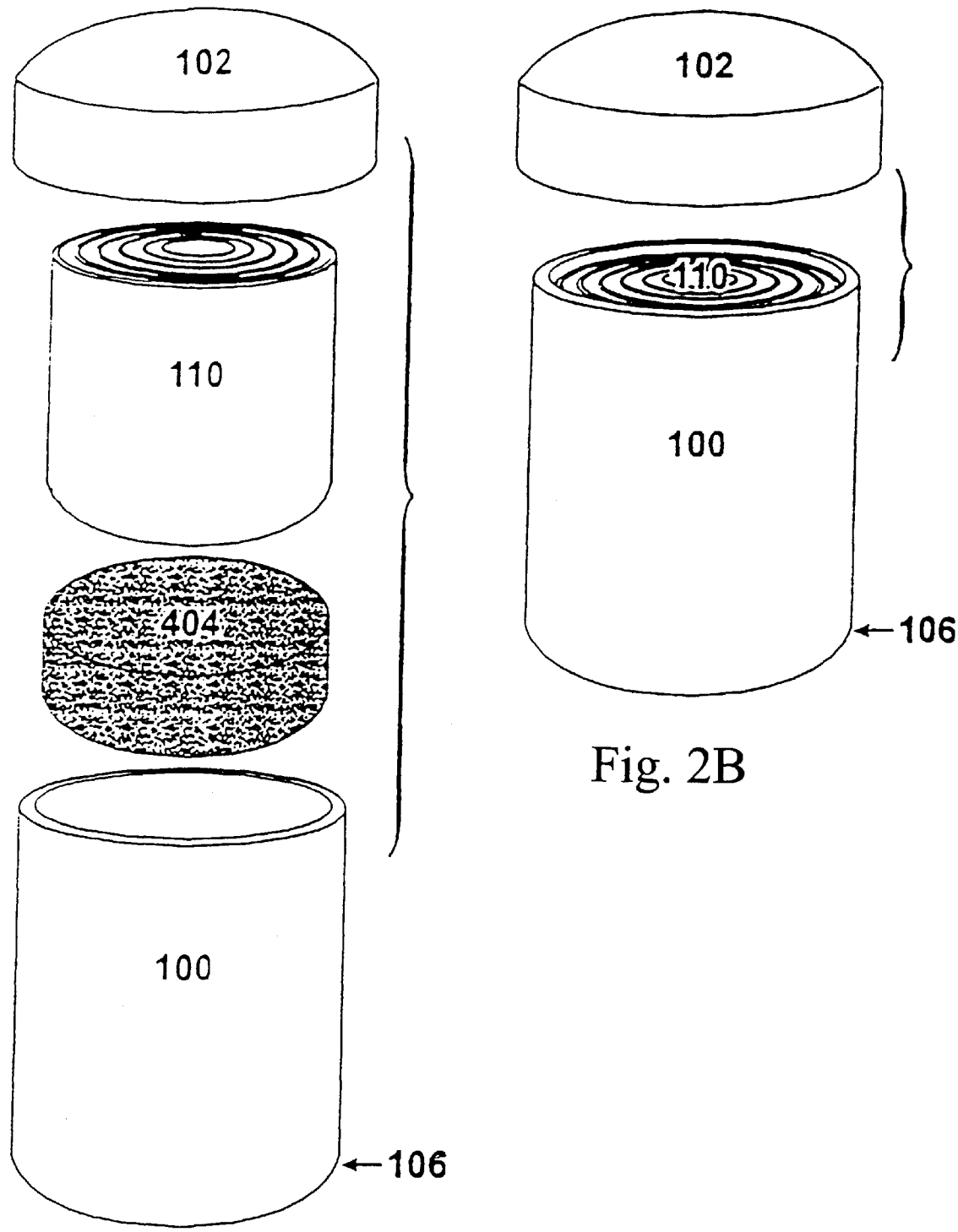
FIG. 2 is an exploded view of a single monitor with a chamber containing a non-toxic food source and a treated non-edible foraging matrix disc that is placed between the non-toxic food and the termite exit from the chamber.

FIG. 2 is an exploded view of a monitor (PVC tube 100 with a removable cap 102 and a rolled cardboard food source 110) with a treated non-edible foraging matrix disc 404. The capped tube 100 has an open end 106 that serves as an entrance and exit for the termites.

Figure 3:
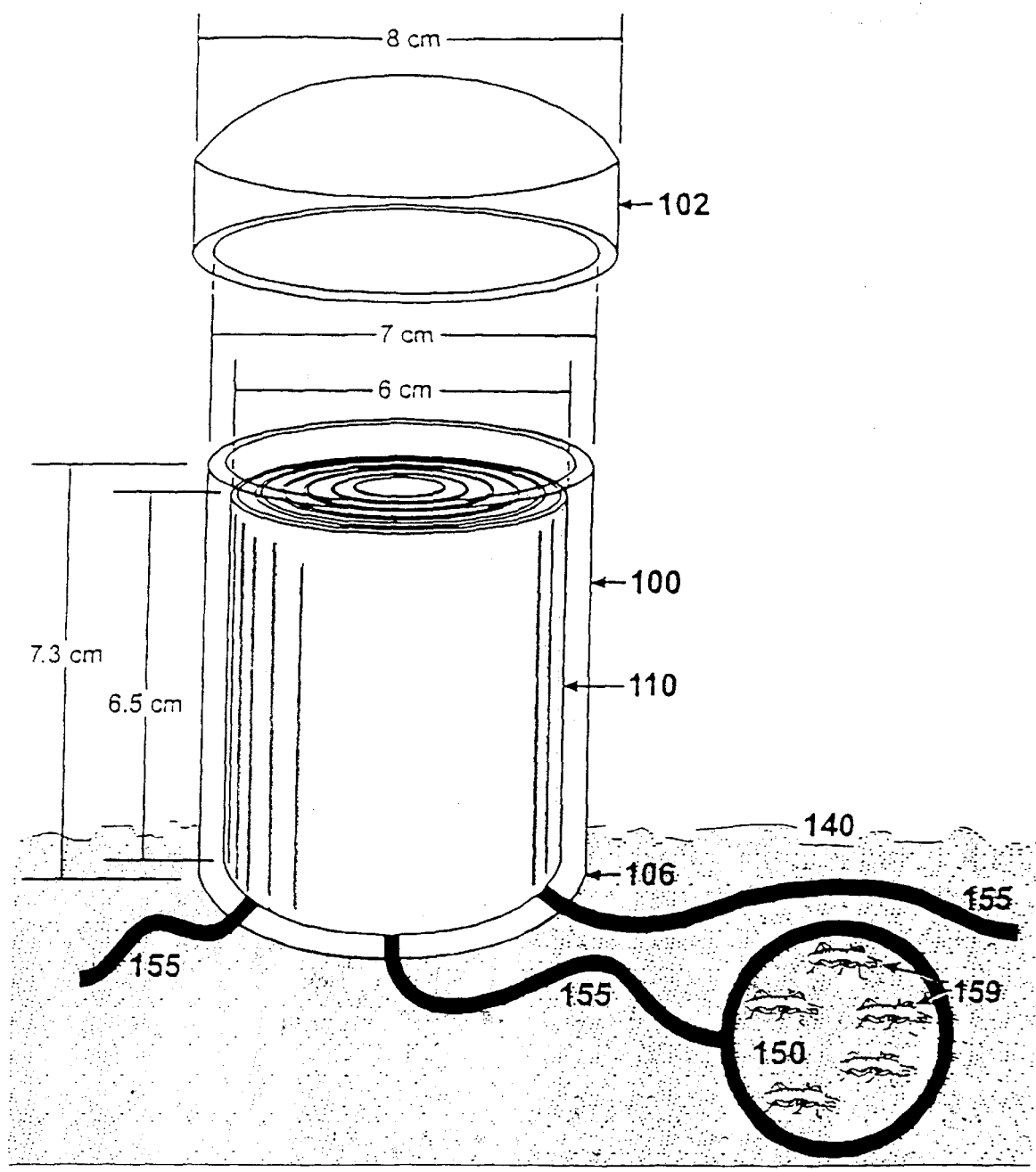
FIG. 3 shows the first step of using a chamber with edible non-toxic food source used to attract termites.

FIG. 3 shows the first step of using a monitor with an edible nontoxic food source used to attract termites. Referring to FIG. 3, a PVC tube 100 has a removable cap 102, and an open end 106. An edible non-toxic food source 110 (cardboard) is inserted into the open end 106 of the tube 100. The open end 106 of tube 100 is then inserted into the ground adjacent to tunnels 155 leading to a termite colony 150 so that termites 159 can be directed to pass through the open end 106 of the tube to eat the food source 110.

Figure 4:
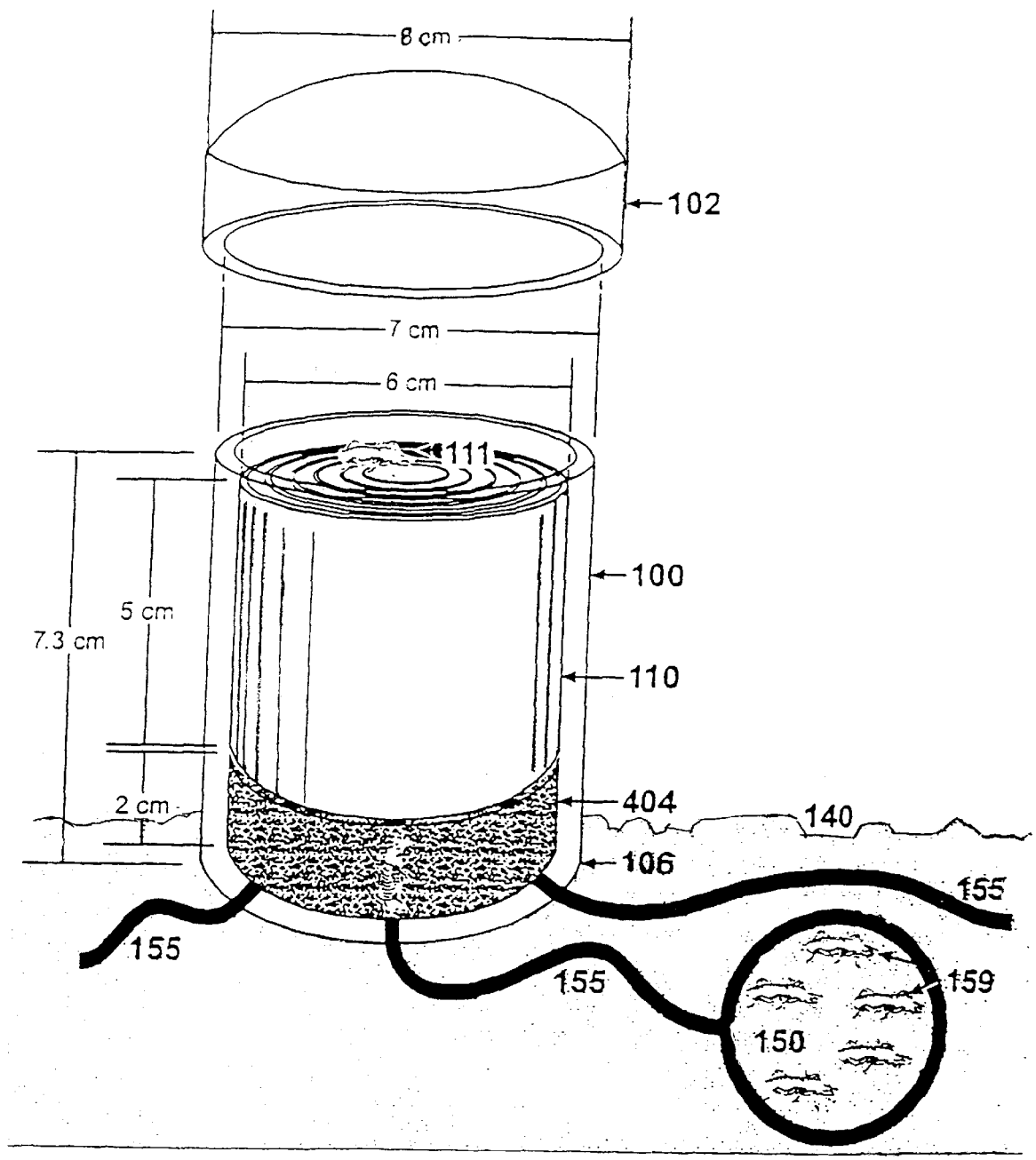
FIG. 4 shows a second step of inserting a non-edible foraging matrix treated with a slow-acting and non-repellant toxicant between the food source having active termite infestation inside the chamber and the only exit for the chamber.

FIG. 4 shows a second step of inserting a non-edible foraging matrix treated with a slow acting and non-repellant toxicant between a food source having active termite infestation inside the chamber and the only exit for the chamber. Referring to FIG. 4, a non-edible foraging matrix, such as a disk of non-edible foraging matrix 404, treated with a slow acting and non-repellant toxicant is inserted into the opening 106 of tube 100 between the food source 110 having infested termites 111 therein and the ground 140 with a termite tunnel 155 connecting the termite colony 150 in the soil to the food source 110.

Figure 5:
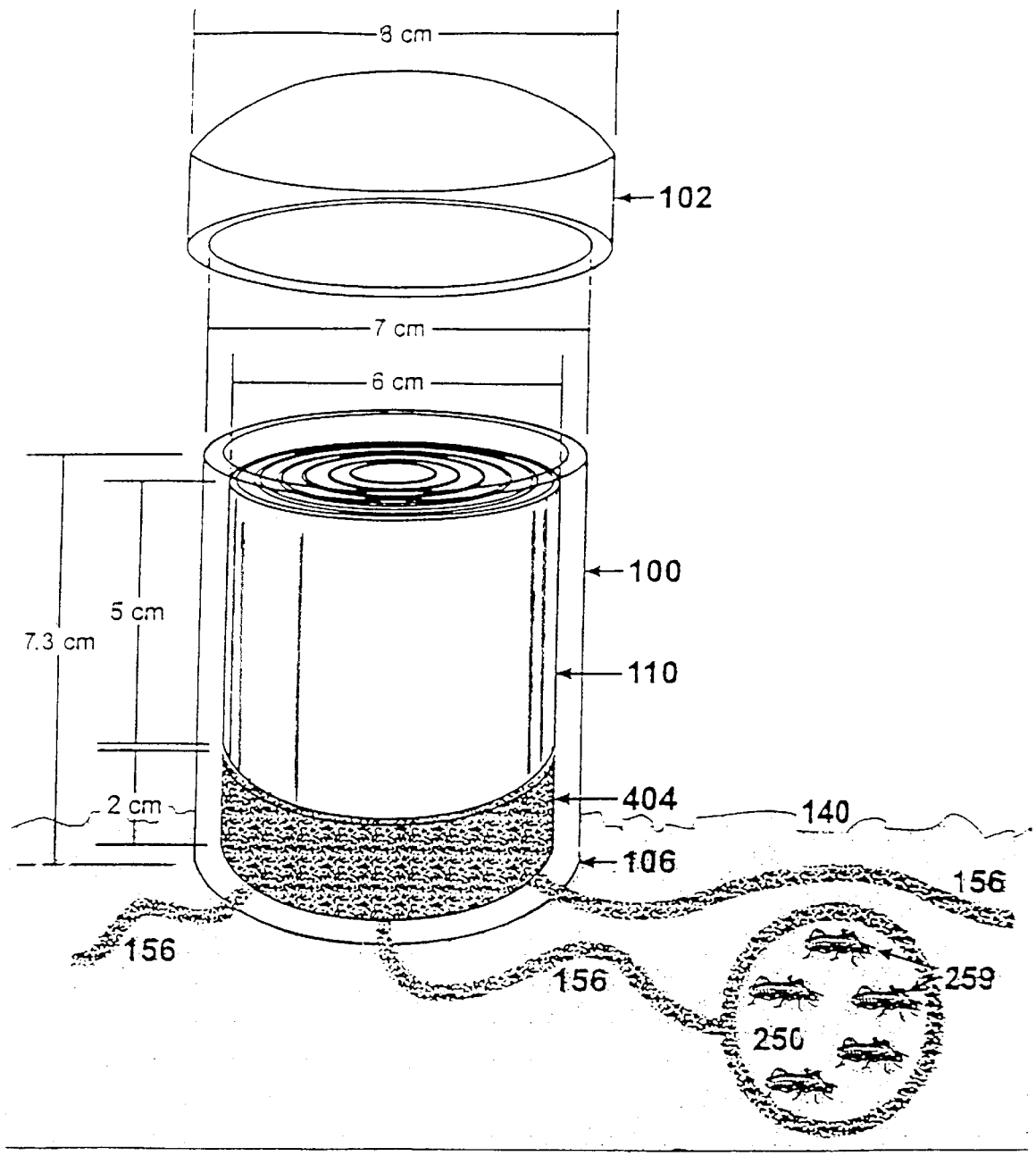
FIG. 5 shows a third step of the termites having passed through the foraging matrix and now contaminating their tunnels and colonies with the slow acting non-repellant toxicant.

FIG. 5 shows a third step of the termites having tunneled through the non-edible foraging matrix disk 404 and now moving the treated non-edible foraging matrix and creating contaminated tunnels 156 and contaminated colonies 250 with the slow acting non-repellant toxicant. Termites returning from the food source 110 are forced to tunnel through the non-edible foraging matrix disk. The termites remove contaminated particles of the non-edible foraging matrix as they pass back into the soil. The contaminated termites 259 incorporate the treated non-edible foraging matrix particles into their tunnels 156 and contaminate the rest of the colony 250. The slow acting toxicant in the non-edible foraging matrix particles kills and destroys termites 259 over time after they contact it in their tunnels 156 and in their colonies 250.

The nonedible foraging matrix can be wrapped in various materials such as but not limited to thin plastic film (i.e. Saran Wrap®), and the like.

While the preferred embodiment refers to a PVC tube chamber, the chamber can be of various configurations such as but not limited to cylindrical, square, rectangular, and the like.

Although the preferred embodiment is described for use as a device placed in the ground to kill subterranean termites, a similar device could be placed on wood in structures to kill subterranean termites tunneling into houses and feeding on wood within houses.

The invention can be used to protect all type of cellulose containing structures such as but not limited to manmade structures such as buildings, walls, and the like and natural structures such as trees, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of killing termites and protecting structures, comprising the steps of:

(a) providing a nontoxic food source into a chamber having a termite entrance and exit opening and a closed end;

(b) positioning the termite entrance and exit opening to the chamber adjacent to termites and allowing the termites to enter and eat the nontoxic food source;

(c) providing a foraging non-edible matrix treated with a slow acting and non-repellant toxicant into the termite entrance and exit opening to the chamber so that the foraging matrix is between the non-toxic food source and the termite entrance and exit opening; and (d) allowing the termites to exit from the termite entrance and exit opening to the chamber, wherein the slow acting and non-repellant toxicant destroys the termites in their colonies over time and protects structures.

2. The method of killing termites and protecting structures of claim 1, wherein the chamber includes:
   a PVC tube.

3. The method of killing termites and protecting structures of claim 1, wherein the positioning step includes:
   pushing the termite entrance and exit opening to the chamber into the ground.

4. The method of killing termites and protecting structures of claim 1, wherein the non-edible foraging matrix is chosen from at least one of:
   Soil, sand and mixtures thereof.

5. The method of killing termites and protecting structures of claim 4, wherein the non-edible foraging matrix includes:
   a disc.

6. The method of killing termites and protecting structures of claim 5, wherein the disc of the non-edible foraging matrix includes:
   a bag containing the non-edible foraging matrix, the bag chosen from at least one of paper and a cellulose material.

7. The method of killing termites and protecting structures of claim 1, wherein the slow acting and non repellant toxicant is selected from the group consisting of a chlorinated nicotine derivative, and organophosphate, a pyrrole, and mixtures thereof.

8. The method of killing termites and protecting structures of claim 1, wherein the slow acting and non-repellant toxicant is selected from the group consisting of fipronil, chlorfenapyr, imidacloprid, chlorpyifox, and mixtures thereof.

9. The method of killing termites and protecting structures of claim 1, wherein the slow acting and non-repellant toxicant includes:
   approximately 1.25 ppm to approximately 125 ppm of fipronil.

10. The method of killing termites and protecting structures of claim 1, wherein the slow acting and non-repellent toxicant includes:
    approximately 2.5 ppm to approximately 250 ppm of chlorfenapyr.

11. The method of killing termites and protecting structures of claim 1, wherein the slow acting and non-repellent toxicant includes:
    approximately 0.5 ppm to approximately 50 ppm of imidacloprid.

12. The method of killing termites and protecting structures of claim 1, wherein the slow acting and non-repellent toxicant includes:
    approximately 0.5 ppm to approximately 50 ppm of chlorpyrifos.

13. The method of killing termites and protecting structures of claim 1, wherein the termites include:
    subterranean termites.

14. The method of killing termites and protecting structures of claim 1, wherein the nontoxic bait is chosen from at least one of:
    wood, paper, cardboard, cellulose-based material and mixtures thereof.

15. An apparatus for killing termites and protecting structures, comprising the combination of:
    a chamber having an entrance and exit opening for termites and a closed end;
    a non-toxic, edible termite food source inside the chamber for attracting termites through the entrance and exit opening to the chamber; and
    a foraging non-edible matrix having a slow acting and non-repellant toxicant, wherein said matrix is inserted at a later time between the entrance and exit opening to the chamber and the termite food source having termites therein, wherein the termites are forced to pass through and disperse the slow acting and non-repellant toxicant to their tunnels and living space, in order to kill termites over time and protect structures.

16. The apparatus for killing termites and protecting structures of claim 15, wherein the chamber includes:
    a PVC tube with a removable cap.

17. The apparatus for killing termites and protecting structures of claim 15, wherein the foraging non-edible matrix includes:
    a disc of at least one of: soil, sand and mixtures thereof.

18. The apparatus for killing termites and protecting structures of claim 17, wherein the disc of the foraging non-edible matrix includes:
    a bag surrounding the foraging non-edible matrix.

19. The apparatus for killing termites and protecting structures of claim 15, wherein the slow acting and non-repellant toxicant is selected from the group consisting of a chlorinated nicotine derivative, an organophosphate, a pyrrole, and mixtures thereof.

20. The apparatus for killing termites and protecting structures of claim 15, wherein the slow acting and non-repellant toxicant is selected from the group consisting of fipronil, chlorfenapyr, imidacloprid, chlorpyrifox, and mixtures thereof.

21. The apparatus for killing termites and protecting structures of claim 15, wherein the slow acting and non-repellant toxicant includes:
    approximately 1.25 ppm to approximately 125 ppm of fipronil.

22. The apparatus for killing termites and protecting structures of claim 15, wherein the slow acting and non-repellent toxicant includes:
    approximately 2.5 ppm to approximately 250 ppm of chlorfenapyr.

23. The apparatus for killing termites and protecting structures of claim 15, wherein the slow acting and non-repellent toxicant includes:
    approximately 0.5 ppm to approximately 50 ppm of imidacloprid.

24. The apparatus for killing termites and protecting structures of claim 15, wherein the slow acting and non-repellent toxicant includes:
    approximately 0.5 ppm to approximately 50 ppm of chlorpyrifos.

25. A composition for dispersing toxicant to termites comprising;
    a non-edible foraging matrix,
    a slow acting, non-repellant toxicant mixed with said matrix to form a matrix-toxicant mixture, and
    an outer covering to contain the matrix-toxicant mixture wherein said outer covering will allow termites to access said matrix-toxicant mixture.

26. The composition of claim 25 wherein said toxicant is selected from the group consisting of a chlorinated nicotine derivative, an organophosphate, a pyrrole, and mixtures thereof.

27. The composition of claim 25 wherein said toxicant is selected from the group consisting of fipronil, chlorfenapyr, imidacloprid, chlorpyrifox, and mixtures thereof.

28. The composition of claim 25 wherein said matrix is selected from the group consisting of sand, soil, and mixtures thereof.

* * * * *